United States Patent [19]
Shida et al.

[11] Patent Number: 6,075,827
[45] Date of Patent: Jun. 13, 2000

[54] DQPSK MAPPING CIRCUIT

[75] Inventors: Kazuo Shida; Katsuhiko Hiramatsu, both of Yokohama, Japan

[73] Assignee: Matsushita Electric Industrial Co., Ltd., Osaka, Japan

[21] Appl. No.: 08/944,510

[22] Filed: Oct. 6, 1997

[30] Foreign Application Priority Data

Oct. 4, 1996  [JP]  Japan ................................ 8-264917

[51] Int. Cl.⁷ .............................. H03D 3/22; H04L 27/22
[52] U.S. Cl. ............................................. 375/331; 329/310
[58] Field of Search ................................... 375/259, 261, 375/269, 279, 282, 329, 330, 331, 332, 333, 341, 340; 329/304, 303, 310; 341/100

[56] References Cited

U.S. PATENT DOCUMENTS 4,714,913  12/1987  Cohen .
5,717,394   2/1998  Schwartz et al. ...................... 341/51

FOREIGN PATENT DOCUMENTS

5-78050  10/1993  Japan .
6-252961  9/1994  Japan .

*Primary Examiner*—Chi H. Pham
*Assistant Examiner*—Jean B Corrielus
*Attorney, Agent, or Firm*—Lowe Hauptman Gopstein Gilman & Berner

[57] ABSTRACT

A DQPSK mapping circuit is disclosed which comprises: a parallel decoding circuit having inputs for decoding first to 2Nth bits of input data and one symbol period prior I and Q data which are prior by one symbol period from the present decoding cycle thereof through the inputs and outputting serial first to Nth I and Q data of the present decoding period in parallel, N is a natural number; and a FF circuit for supplying the Nth I and Q data to the inputs as the one symbol period prior I and Q data in the succeeding decoding cycle of the parallel decoding circuit. The parallel decoding circuit may comprise first to Nth decoders, an Mth decoder out of the first to Nth decoders decoding 2Mth bit and (2M−1)th bits of the input data and outputs of (M−1)th decoder, M being a natural number and M≦N, wherein the first decoder decodes the one symbol period prior I and Q data and the first and second bits of the input data.

10 Claims, 12 Drawing Sheets

| INPUT | MSB OF ONE SYMBOL PERIOD PRIOR I,Q | | | |
|---|---|---|---|---|
| | 00 | 01 | 11 | 10 |
| 00 00 00 00 | ①①①① | ②②②② | ③③③③ | ④④④④ |
| 00 00 00 01 | ①①①② | ②②②③ | ③③③④ | ④④④① |
| 00 00 00 11 | ①①①③ | ②②②④ | ③③③① | ④④④② |
| 00 00 00 10 | ①①①④ | ②②②① | ③③③② | ④④④③ |
| 00 00 01 00 | ①①②② | ②②③③ | ③③④④ | ④④①① |
| 00 00 01 01 | ①①②③ | ②②③④ | ③③④① | ④④①② |
| 00 00 01 11 | ①①②④ | ②②③① | ③③④② | ④④①③ |
| 00 00 01 10 | ①①②① | ②②③② | ③③④③ | ④④①④ |
| 00 00 11 00 | ①①③③ | ②②④④ | ③③①① | ④④②② |
| 00 00 11 01 | ①①③④ | ②②④① | ③③①② | ④④②③ |
| 00 00 11 11 | ①①③① | ②②④② | ③③①③ | ④④②④ |
| 00 00 11 10 | ①①③② | ②②④③ | ③③①④ | ④④②① |
| 00 00 10 00 | ①①④④ | ②②①① | ③③②② | ④④③③ |
| 00 00 10 01 | ①①④① | ②②①② | ③③②③ | ④④③④ |
| 00 00 10 11 | ①①④② | ②②①③ | ③③②④ | ④④③① |
| 00 00 10 10 | ①①④③ | ②②①④ | ③③②① | ④④③② |
| 00 01 00 00 | ①②②② | ②③③③ | ③④④④ | ④①①① |
| 00 01 00 01 | ①②②③ | ②③③④ | ③④④① | ④①①② |
| 00 01 00 11 | ①②②④ | ②③③① | ③④④② | ④①①③ |
| 00 01 00 10 | ①②②① | ②③③② | ③④④③ | ④①①④ |
| 00 01 01 00 | ①②③③ | ②③④④ | ③④①① | ④①②② |
| 00 01 01 01 | ①②③④ | ②③④① | ③④①② | ④①②③ |
| 00 01 01 11 | ①②③① | ②③④② | ③④①③ | ④①②④ |
| 00 01 01 10 | ①②③② | ②③④③ | ③④①④ | ④①②① |
| 00 01 11 00 | ①②④④ | ②③①① | ③④②② | ④①③③ |
| 00 01 11 01 | ①②④① | ②③①② | ③④②③ | ④①③④ |
| 00 01 11 11 | ①②④② | ②③①③ | ③④②④ | ④①③① |
| 00 01 11 10 | ①②④③ | ②③①④ | ③④②① | ④①③② |
| 00 01 10 00 | ①②①① | ②③②② | ③④③③ | ④①④④ |
| 00 01 10 01 | ①②①② | ②③②③ | ③④③④ | ④①④① |
| 00 01 10 11 | ①②①③ | ②③②④ | ③④③① | ④①④② |
| 00 01 10 10 | ①②①④ | ②③②① | ③④③② | ④①④③ |

FIG. 3

| INPUT | MSB OF ONE SYMBOL PERIOD PRIOR I,Q | | | |
| --- | --- | --- | --- | --- |
| | 00 | 01 | 11 | 10 |
| 00 11 00 00 | ①③③③ | ②④④④ | ③①①① | ④②②② |
| 00 11 00 01 | ①③③④ | ②④④① | ③①①② | ④②②③ |
| 00 11 00 11 | ①③③① | ②④④② | ③①①③ | ④②②④ |
| 00 11 00 10 | ①③③② | ②④④③ | ③①①④ | ④②②① |
| 00 11 01 00 | ①③④④ | ②④①① | ③①②② | ④②③③ |
| 00 11 01 01 | ①③④① | ②④①② | ③①②③ | ④②③④ |
| 00 11 01 11 | ①③④② | ②④①③ | ③①②④ | ④②③① |
| 00 11 01 10 | ①③④③ | ②④①④ | ③①②① | ④②③② |
| 00 11 11 00 | ①③①① | ②④②② | ③①③③ | ④②④④ |
| 00 11 11 01 | ①③①② | ②④②③ | ③①③④ | ④②④① |
| 00 11 11 11 | ①③①③ | ②④②④ | ③①③① | ④②④② |
| 00 11 11 10 | ①③①④ | ②④②① | ③①③② | ④②④③ |
| 00 11 10 00 | ①③②② | ②④③③ | ③①④④ | ④②①① |
| 00 11 10 01 | ①③②③ | ②④③④ | ③①④① | ④②①② |
| 00 11 10 11 | ①③②④ | ②④③① | ③①④② | ④②①③ |
| 00 11 10 10 | ①③②① | ②④③② | ③①④③ | ④②①④ |
| 00 10 00 00 | ①④④④ | ②①①① | ③②②② | ④③③③ |
| 00 10 00 01 | ①④④① | ②①①② | ③②②③ | ④③③④ |
| 00 10 00 11 | ①④④② | ②①①③ | ③②②④ | ④③③① |
| 00 10 00 10 | ①④④③ | ②①①④ | ③②②① | ④③③② |
| 00 10 01 00 | ①④①① | ②①②② | ③②③③ | ④③④④ |
| 00 10 01 01 | ①④①② | ②①②③ | ③②③④ | ④③④① |
| 00 10 01 11 | ①④①③ | ②①②④ | ③②③① | ④③④② |
| 00 10 01 10 | ①④①④ | ②①②① | ③②③② | ④③④③ |
| 00 10 11 00 | ①④②② | ②①③③ | ③②④④ | ④③①① |
| 00 10 11 01 | ①④②③ | ②①③④ | ③②④① | ④③①② |
| 00 10 11 11 | ①④②④ | ②①③① | ③②④② | ④③①③ |
| 00 10 11 10 | ①④②① | ②①③② | ③②④③ | ④③①④ |
| 00 10 10 00 | ①④③③ | ②①④④ | ③②①① | ④③②② |
| 00 10 10 01 | ①④③④ | ②①④① | ③②①② | ④③②③ |
| 00 10 10 11 | ①④③① | ②①④② | ③②①③ | ④③②④ |
| 00 10 10 10 | ①④③② | ②①④③ | ③②①④ | ④③②① |

FIG. 4

| INPUT | MSB OF ONE SYMBOL PERIOD PRIOR I,Q | | | |
|---|---|---|---|---|
| | 00 | 01 | 11 | 10 |
| 01 00 00 00 | ②②②② | ③③③③ | ④④④④ | ①①①① |
| 01 00 00 01 | ②②②③ | ③③③④ | ④④④① | ①①①② |
| 01 00 00 11 | ②②②④ | ③③③① | ④④④② | ①①①③ |
| 01 00 00 10 | ②②②① | ③③③② | ④④④③ | ①①①④ |
| 01 00 01 00 | ②②③③ | ③③④④ | ④④①① | ①①②② |
| 01 00 01 01 | ②②③④ | ③③④① | ④④①② | ①①②③ |
| 01 00 01 11 | ②②③① | ③③④② | ④④①③ | ①①②④ |
| 01 00 01 10 | ②②③② | ③③④③ | ④④①④ | ①①②① |
| 01 00 11 00 | ②②④④ | ③③①① | ④④②② | ①①③③ |
| 01 00 11 01 | ②②④① | ③③①② | ④④②③ | ①①③④ |
| 01 00 11 11 | ②②④② | ③③①③ | ④④②④ | ①①③① |
| 01 00 11 10 | ②②④③ | ③③①④ | ④④②① | ①①③② |
| 01 00 10 00 | ②②①① | ③③②② | ④④③③ | ①①④④ |
| 01 00 10 01 | ②②①② | ③③②③ | ④④③④ | ①①④① |
| 01 00 10 11 | ②②①③ | ③③②④ | ④④③① | ①①④② |
| 01 00 10 10 | ②②①④ | ③③②① | ④④③② | ①①④③ |
| 01 01 00 00 | ②③③③ | ③④④④ | ④①①① | ①②②② |
| 01 01 00 01 | ②③③④ | ③④④① | ④①①② | ①②②③ |
| 01 01 00 11 | ②③③① | ③④④② | ④①①③ | ①②②④ |
| 01 01 00 10 | ②③③② | ③④④③ | ④①①④ | ①②②① |
| 01 01 01 00 | ②③④④ | ③④①① | ④①②② | ①②③③ |
| 01 01 01 01 | ②③④① | ③④①② | ④①②③ | ①②③④ |
| 01 01 01 11 | ②③④② | ③④①③ | ④①②④ | ①②③① |
| 01 01 01 10 | ②③④③ | ③④①④ | ④①②① | ①②③② |
| 01 01 11 00 | ②③①① | ③④②② | ④①③③ | ①②④④ |
| 01 01 11 01 | ②③①② | ③④②③ | ④①③④ | ①②④① |
| 01 01 11 11 | ②③①③ | ③④②④ | ④①③① | ①②④② |
| 01 01 11 10 | ②③①④ | ③④②① | ④①③② | ①②④③ |
| 01 01 10 00 | ②③②② | ③④③③ | ④①④④ | ①②①① |
| 01 01 10 01 | ②③②③ | ③④③④ | ④①④① | ①②①② |
| 01 01 10 11 | ②③②④ | ③④③① | ④①④② | ①②①③ |
| 01 01 10 10 | ②③②① | ③④③② | ④①④③ | ①②①④ |

FIG. 5

| INPUT | MSB OF ONE SYMBOL PERIOD PRIOR I,Q | | | |
|---|---|---|---|---|
| | 00 | 01 | 11 | 10 |
| 01 11 00 00 | ②④④④ | ③①①① | ④②②② | ①③③③ |
| 01 11 00 01 | ②④④① | ③①①② | ④②②③ | ①③③④ |
| 01 11 00 11 | ②④④② | ③①①③ | ④②②④ | ①③③① |
| 01 11 00 10 | ②④④③ | ③①①④ | ④②②① | ①③③② |
| 01 11 01 00 | ②④①① | ③①②② | ④②③③ | ①③④④ |
| 01 11 01 01 | ②④①② | ③①②③ | ④②③④ | ①③④① |
| 01 11 01 11 | ②④①③ | ③①②④ | ④②③① | ①③④② |
| 01 11 01 10 | ②④①④ | ③①②① | ④②③② | ①③④③ |
| 01 11 11 00 | ②④②② | ③①③③ | ④②④④ | ①③①① |
| 01 11 11 01 | ②④②③ | ③①③④ | ④②④① | ①③①② |
| 01 11 11 11 | ②④②④ | ③①③① | ④②④② | ①③①③ |
| 01 11 11 10 | ②④②① | ③①③② | ④②④③ | ①③①④ |
| 01 11 10 00 | ②④③③ | ③①④④ | ④②①① | ①③②② |
| 01 11 10 01 | ②④③④ | ③①④① | ④②①② | ①③②③ |
| 01 11 10 11 | ②④③① | ③①④② | ④②①③ | ①③②④ |
| 01 11 10 10 | ②④③② | ③①④③ | ④②①④ | ①③②① |
| 01 10 00 00 | ②①①① | ③②②② | ④③③③ | ①④④④ |
| 01 10 00 01 | ②①①② | ③②②③ | ④③③④ | ①④④① |
| 01 10 00 11 | ②①①③ | ③②②④ | ④③③① | ①④④② |
| 01 10 00 10 | ②①①④ | ③②②① | ④③③② | ①④④③ |
| 01 10 01 00 | ②①②② | ③②③③ | ④③④④ | ①④①① |
| 01 10 01 01 | ②①②③ | ③②③④ | ④③④① | ①④①② |
| 01 10 01 11 | ②①②④ | ③②③① | ④③④② | ①④①③ |
| 01 10 01 10 | ②①②① | ③②③② | ④③④③ | ①④①④ |
| 01 10 11 00 | ②①③③ | ③②④④ | ④③①① | ①④②② |
| 01 10 11 01 | ②①③④ | ③②④① | ④③①② | ①④②③ |
| 01 10 11 11 | ②①③① | ③②④② | ④③①③ | ①④②④ |
| 01 10 11 10 | ②①③② | ③②④③ | ④③①④ | ①④②① |
| 01 10 10 00 | ②①④④ | ③②①① | ④③②② | ①④③③ |
| 01 10 10 01 | ②①④① | ③②①② | ④③②③ | ①④③④ |
| 01 10 10 11 | ②①④② | ③②①③ | ④③②④ | ①④③① |
| 01 10 10 10 | ②①④③ | ③②①④ | ④③②① | ①④③② |

FIG. 6

| INPUT | MSB OF ONE SYMBOL PERIOD PRIOR I,Q | | | |
|---|---|---|---|---|
| | 00 | 01 | 11 | 10 |
| 11 00 00 00 | ③③③③ | ④④④④ | ①①①① | ②②②② |
| 11 00 00 01 | ③③③④ | ④④④① | ①①①② | ②②②③ |
| 11 00 00 11 | ③③③① | ④④④② | ①①①③ | ②②②④ |
| 11 00 00 10 | ③③③② | ④④④③ | ①①①④ | ②②②① |
| 11 00 01 00 | ③③④④ | ④④①① | ①①②② | ②②③③ |
| 11 00 01 01 | ③③④① | ④④①② | ①①②③ | ②②③④ |
| 11 00 01 11 | ③③④② | ④④①③ | ①①②④ | ②②③① |
| 11 00 01 10 | ③③④③ | ④④①④ | ①①②① | ②②③② |
| 11 00 11 00 | ③③①① | ④④②② | ①①③③ | ②②④④ |
| 11 00 11 01 | ③③①② | ④④②③ | ①①③④ | ②②④① |
| 11 00 11 11 | ③③①③ | ④④②④ | ①①③① | ②②④② |
| 11 00 11 10 | ③③①④ | ④④②① | ①①③② | ②②④③ |
| 11 00 10 00 | ③③②② | ④④③③ | ①①④④ | ②②①① |
| 11 00 10 01 | ③③②③ | ④④③④ | ①①④① | ②②①② |
| 11 00 10 11 | ③③②④ | ④④③① | ①①④② | ②②①③ |
| 11 00 10 10 | ③③②① | ④④③② | ①①④③ | ②②①④ |
| 11 01 00 00 | ③④④④ | ④①①① | ①②②② | ②③③③ |
| 11 01 00 01 | ③④④① | ④①①② | ①②②③ | ②③③④ |
| 11 01 00 11 | ③④④② | ④①①③ | ①②②④ | ②③③① |
| 11 01 00 10 | ③④④③ | ④①①④ | ①②②① | ②③③② |
| 11 01 01 00 | ③④①① | ④①②② | ①②③③ | ②③④④ |
| 11 01 01 01 | ③④①② | ④①②③ | ①②③④ | ②③④① |
| 11 01 01 11 | ③④①③ | ④①②④ | ①②③① | ②③④② |
| 11 01 01 10 | ③④①④ | ④①②① | ①②③② | ②③④③ |
| 11 01 11 00 | ③④②② | ④①③③ | ①②④④ | ②③①① |
| 11 01 11 01 | ③④②③ | ④①③④ | ①②④① | ②③①② |
| 11 01 11 11 | ③④②④ | ④①③① | ①②④② | ②③①③ |
| 11 01 11 10 | ③④②① | ④①③② | ①②④③ | ②③①④ |
| 11 01 10 00 | ③④③③ | ④①④④ | ①②①① | ②③②② |
| 11 01 10 01 | ③④③④ | ④①④① | ①②①② | ②③②③ |
| 11 01 10 11 | ③④③① | ④①④② | ①②①③ | ②③②④ |
| 11 01 10 10 | ③④③② | ④①④③ | ①②①④ | ②③②① |

FIG. 7

| INPUT | MSB OF ONE SYMBOL PERIOD PRIOR I,Q | | | |
|---|---|---|---|---|
| | 00 | 01 | 11 | 10 |
| 11 11 00 00 | ③①①① | ④②②② | ①③③③ | ②④④④ |
| 11 11 00 01 | ③①①② | ④②②③ | ①③③④ | ②④④① |
| 11 11 00 11 | ③①①③ | ④②②④ | ①③③① | ②④④② |
| 11 11 00 10 | ③①①④ | ④②②① | ①③③② | ②④④③ |
| 11 11 01 00 | ③①②② | ④②③③ | ①③④④ | ②④①① |
| 11 11 01 01 | ③①②③ | ④②③④ | ①③④① | ②④①② |
| 11 11 01 11 | ③①②④ | ④②③① | ①③④② | ②④①③ |
| 11 11 01 10 | ③①②① | ④②③② | ①③④③ | ②④①④ |
| 11 11 11 00 | ③①③③ | ④②④④ | ①③①① | ②④②② |
| 11 11 11 01 | ③①③④ | ④②④① | ①③①② | ②④②③ |
| 11 11 11 11 | ③①③① | ④②④② | ①③①③ | ②④②④ |
| 11 11 11 10 | ③①③② | ④②④③ | ①③①④ | ②④②① |
| 11 11 10 00 | ③①④④ | ④②①① | ①③②② | ②④③③ |
| 11 11 10 01 | ③①④① | ④②①② | ①③②③ | ②④③④ |
| 11 11 10 11 | ③①④② | ④②①③ | ①③②④ | ②④③① |
| 11 11 10 10 | ③①④③ | ④②①④ | ①③②① | ②④③② |
| 11 10 00 00 | ③②②② | ④③③③ | ①④④④ | ②①①① |
| 11 10 00 01 | ③②②③ | ④③③④ | ①④④① | ②①①② |
| 11 10 00 11 | ③②②④ | ④③③① | ①④④② | ②①①③ |
| 11 10 00 10 | ③②②① | ④③③② | ①④④③ | ②①①④ |
| 11 10 01 00 | ③②③③ | ④③④④ | ①④①① | ②①②② |
| 11 10 01 01 | ③②③④ | ④③④① | ①④①② | ②①②③ |
| 11 10 01 11 | ③②③① | ④③④② | ①④①③ | ②①②④ |
| 11 10 01 10 | ③②③② | ④③④③ | ①④①④ | ②①②① |
| 11 10 11 00 | ③②④④ | ④③①① | ①④②② | ②①③③ |
| 11 10 11 01 | ③②④① | ④③①② | ①④②③ | ②①③④ |
| 11 10 11 11 | ③②④② | ④③①③ | ①④②④ | ②①③① |
| 11 10 11 10 | ③②④③ | ④③①④ | ①④②① | ②①③② |
| 11 10 10 00 | ③②①① | ④③②② | ①④③③ | ②①④④ |
| 11 10 10 01 | ③②①② | ④③②③ | ①④③④ | ②①④① |
| 11 10 10 11 | ③②①③ | ④③②④ | ①④③① | ②①④② |
| 11 10 10 10 | ③②①④ | ④③②① | ①④③② | ②①④③ |

FIG. 8

| INPUT | MSB OF ONE SYMBOL PERIOD PRIOR I, Q | | | |
|---|---|---|---|---|
| | 00 | 01 | 11 | 10 |
| 10 00 00 00 | ④④④④ | ①①①① | ②②②② | ③③③③ |
| 10 00 00 01 | ④④④① | ①①①② | ②②②③ | ③③③④ |
| 10 00 00 11 | ④④④② | ①①①③ | ②②②④ | ③③③① |
| 10 00 00 10 | ④④④③ | ①①①④ | ②②②① | ③③③② |
| 10 00 01 00 | ④④①① | ①①②② | ②②③③ | ③③④④ |
| 10 00 01 01 | ④④①② | ①①②③ | ②②③④ | ③③④① |
| 10 00 01 11 | ④④①③ | ①①②④ | ②②③① | ③③④② |
| 10 00 01 10 | ④④①④ | ①①②① | ②②③② | ③③④③ |
| 10 00 11 00 | ④④②② | ①①③③ | ②②④④ | ③③①① |
| 10 00 11 01 | ④④②③ | ①①③④ | ②②④① | ③③①② |
| 10 00 11 11 | ④④②④ | ①①③① | ②②④② | ③③①③ |
| 10 00 11 10 | ④④②① | ①①③② | ②②④③ | ③③①④ |
| 10 00 10 00 | ④④③③ | ①①④④ | ②②①① | ③③②② |
| 10 00 10 01 | ④④③④ | ①①④① | ②②①② | ③③②③ |
| 10 00 10 11 | ④④③① | ①①④② | ②②①③ | ③③②④ |
| 10 00 10 10 | ④④③② | ①①④③ | ②②①④ | ③③②① |
| 10 01 00 00 | ④①①① | ①②②② | ②③③③ | ③④④④ |
| 10 01 00 01 | ④①①② | ①②②③ | ②③③④ | ③④④① |
| 10 01 00 11 | ④①①③ | ①②②④ | ②③③① | ③④④② |
| 10 01 00 10 | ④①①④ | ①②②① | ②③③② | ③④④③ |
| 10 01 01 00 | ④①②② | ①②③③ | ②③④④ | ③④①① |
| 10 01 01 01 | ④①②③ | ①②③④ | ②③④① | ③④①② |
| 10 01 01 11 | ④①②④ | ①②③① | ②③④② | ③④①③ |
| 10 01 01 10 | ④①②① | ①②③② | ②③④③ | ③④①④ |
| 10 01 11 00 | ④①③③ | ①②④④ | ②③①① | ③④②② |
| 10 01 11 01 | ④①③④ | ①②④① | ②③①② | ③④②③ |
| 10 01 11 11 | ④①③① | ①②④② | ②③①③ | ③④②④ |
| 10 01 11 10 | ④①③② | ①②④③ | ②③①④ | ③④②① |
| 10 01 10 00 | ④①④④ | ①②①① | ②③②② | ③④③③ |
| 10 01 10 01 | ④①④① | ①②①② | ②③②③ | ③④③④ |
| 10 01 10 11 | ④①④② | ①②①③ | ②③②④ | ③④③① |
| 10 01 10 10 | ④①④③ | ①②①④ | ②③②① | ③④③② |

FIG. 9

| INPUT | MSB OF ONE SYMBOL PERIOD PRIOR I, Q | | | |
|---|---|---|---|---|
| | 00 | 01 | 11 | 10 |
| 10 11 00 00 | ④②②② | ①③③③ | ②④④④ | ③①①① |
| 10 11 00 01 | ④②②③ | ①③③④ | ②④④① | ③①①② |
| 10 11 00 11 | ④②②④ | ①③③① | ②④④② | ③①①③ |
| 10 11 00 10 | ④②②① | ①③③② | ②④④③ | ③①①④ |
| 10 11 01 00 | ④②③③ | ①③④④ | ②④①① | ③①②② |
| 10 11 01 01 | ④②③④ | ①③④① | ②④①② | ③①②③ |
| 10 11 01 11 | ④②③① | ①③④② | ②④①③ | ③①②④ |
| 10 11 01 10 | ④②③② | ①③④③ | ②④①④ | ③①②① |
| 10 11 11 00 | ④②④④ | ①③①① | ②④②② | ③①③③ |
| 10 11 11 01 | ④②④① | ①③①② | ②④②③ | ③①③④ |
| 10 11 11 11 | ④②④② | ①③①③ | ②④②④ | ③①③① |
| 10 11 11 10 | ④②④③ | ①③①④ | ②④②① | ③①③② |
| 10 11 10 00 | ④②①① | ①③②② | ②④③③ | ③①④④ |
| 10 11 10 01 | ④②①② | ①③②③ | ②④③④ | ③①④① |
| 10 11 10 11 | ④②①③ | ①③②④ | ②④③① | ③①④② |
| 10 11 10 10 | ④②①④ | ①③②① | ②④③② | ③①④③ |
| 10 10 00 00 | ④③③③ | ①④④④ | ②①①① | ③②②② |
| 10 10 00 01 | ④③③④ | ①④④① | ②①①② | ③②②③ |
| 10 10 00 11 | ④③③① | ①④④② | ②①①③ | ③②②④ |
| 10 10 00 10 | ④③③② | ①④④③ | ②①①④ | ③②②① |
| 10 10 01 00 | ④③④④ | ①④①① | ②①②② | ③②③③ |
| 10 10 01 01 | ④③④① | ①④①② | ②①②③ | ③②③④ |
| 10 10 01 11 | ④③④② | ①④①③ | ②①②④ | ③②③① |
| 10 10 01 10 | ④③④③ | ①④①④ | ②①②① | ③②③② |
| 10 10 11 00 | ④③①① | ①④②② | ②①③③ | ③②④④ |
| 10 10 11 01 | ④③①② | ①④②③ | ②①③④ | ③②④① |
| 10 10 11 11 | ④③①③ | ①④②④ | ②①③① | ③②④② |
| 10 10 11 10 | ④③①④ | ①④②① | ②①③② | ③②④③ |
| 10 10 10 00 | ④③②② | ①④③③ | ②①④④ | ③②①① |
| 10 10 10 01 | ④③②③ | ①④③④ | ②①④① | ③②①② |
| 10 10 10 11 | ④③②④ | ①④③① | ②①④② | ③②①③ |
| 10 10 10 10 | ④③②① | ①④③② | ②①④③ | ③②①④ |

DQPSK MAPPING CIRCUIT

BACKGROUND OF THE INVENTION

1. Field of the Invention

This invention relates to a DQPSK mapping circuit for generating DQPSK signals from input data.

2. Description of the Prior Art

A DQPSK mapping circuit for generating DQPSK signals from input data is known. Japanese patent application provisional publication No. 6-252961 discloses a π/4 shift QPSK mapping circuit. Moreover, Japanese utility model application provisional publication No. 5-78050 discloses a π/4 DQPSK encoder.

SUMMARY OF THE INVENTION

The aim of the present invention is to provide an improved DQPSK mapping circuit.

According to the present invention, a first DQPSK mapping circuit is provided, which comprises: a parallel decoding circuit having inputs for decoding first to 2Nth bits of input data and one symbol period prior I and Q data which are prior by one symbol period from the present decoding cycle thereof through the inputs and outputting serial first to Nth I and Q data of the present decoding cycle in parallel, N is a natural number; and a supplying circuit for supplying the Nth I and Q data to the inputs as the one symbol period prior I and Q data in the succeeding decoding cycle of the parallel decoding circuit.

In the first DQPSK mapping circuit, the parallel decoding circuit may comprise first to Nth decoders, an Mth decoder out of the first to Nth decoders decoding 2Mth bit and (2M−1)th bits of the input data and outputs of (M−1)th decoder, M being a natural number and M≦N, wherein the first decoder decodes one symbol period prior I and Q data and the first and second bits of the input data.

In the first DQPSK mapping circuit, the supplying circuit may comprise a holding circuit, that is, a flip-flop circuit, for holding values of the Nth I and Q data of the present decoding cycle and outputting the values in the succeeding decoding cycle.

According to the present invention, a second DQPSK mapping circuit is provided, which comprises: a first flip-flop circuit for holding and outputting values of input data of first to 2Nth bits in response to a clock signal indicative of one symbol period; a parallel decoding circuit having inputs for decoding input data of first to 2Nth bits and one symbol period prior I and Q data which are prior by the one symbol period from the present decoding cycle through the inputs and outputting serial first to Nth I and Q data of the present decoding cycle in parallel, N being a natural number; and a second flip-flop circuit responsive to the clock signal for holding values of the Nth I and Q data in the present decoding cycle and outputting the values in the succeeding decoding cycle.

The second DQPSK mapping circuit may further comprise a first selecting circuit responsive to a second clock signal for outputting one of the serial first to Nth I data of the present decoding period successively and a second selecting circuit responsive to the second clock signal for outputting one of the serial first to Nth symbol period Q data of the present decoding period successively, a frequency of the second clock signal being 1/N of a frequency of the first clock signal.

In the second DQPSK mapping circuit, the parallel decoding circuit comprises first to Nth decoders, an Mth decoder out of the first to Nth decoders decoding 2Mth bit and (2M−1)th bits of the input data and outputs of (M−1)th decoder, M being a natural number and M≦N, wherein the first decoder decodes the one symbol period prior I and Q data and the first and second bits of the input data.

BRIEF DESCRIPTION OF THE DRAWINGS

The object and features of the present invention will become more readily apparent from the following detailed description taken in conjunction with the accompanying drawings in which:

FIGS. 2 to 9 are tables of signal conditions of the embodiment;

The same or corresponding elements or parts are designated with like references throughout the drawings.

DETAILED DESCRIPTION OF THE INVENTION

Hereinbelow will be described an embodiment of this invention.

Figure 1:
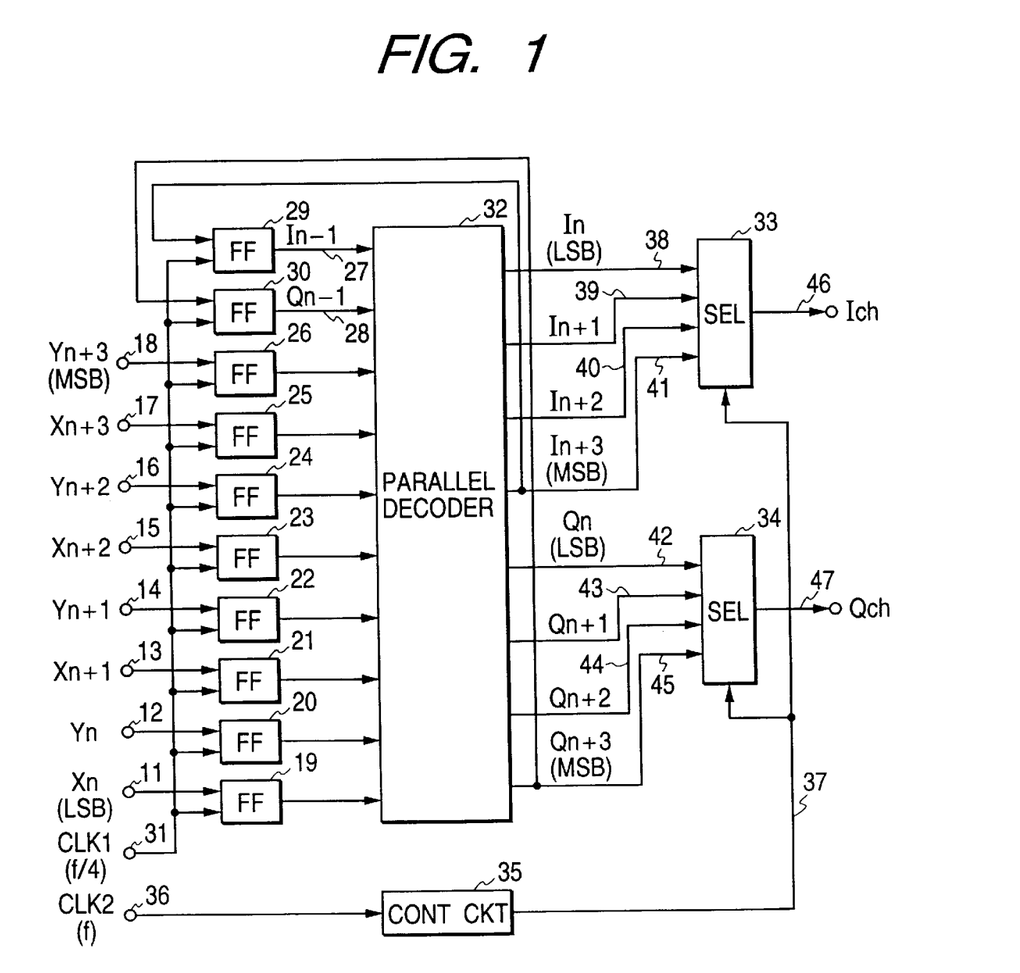
FIG. 1 is a block diagram of a DQPSK modulation circuit of an embodiment to the present invention.
Figure 2:
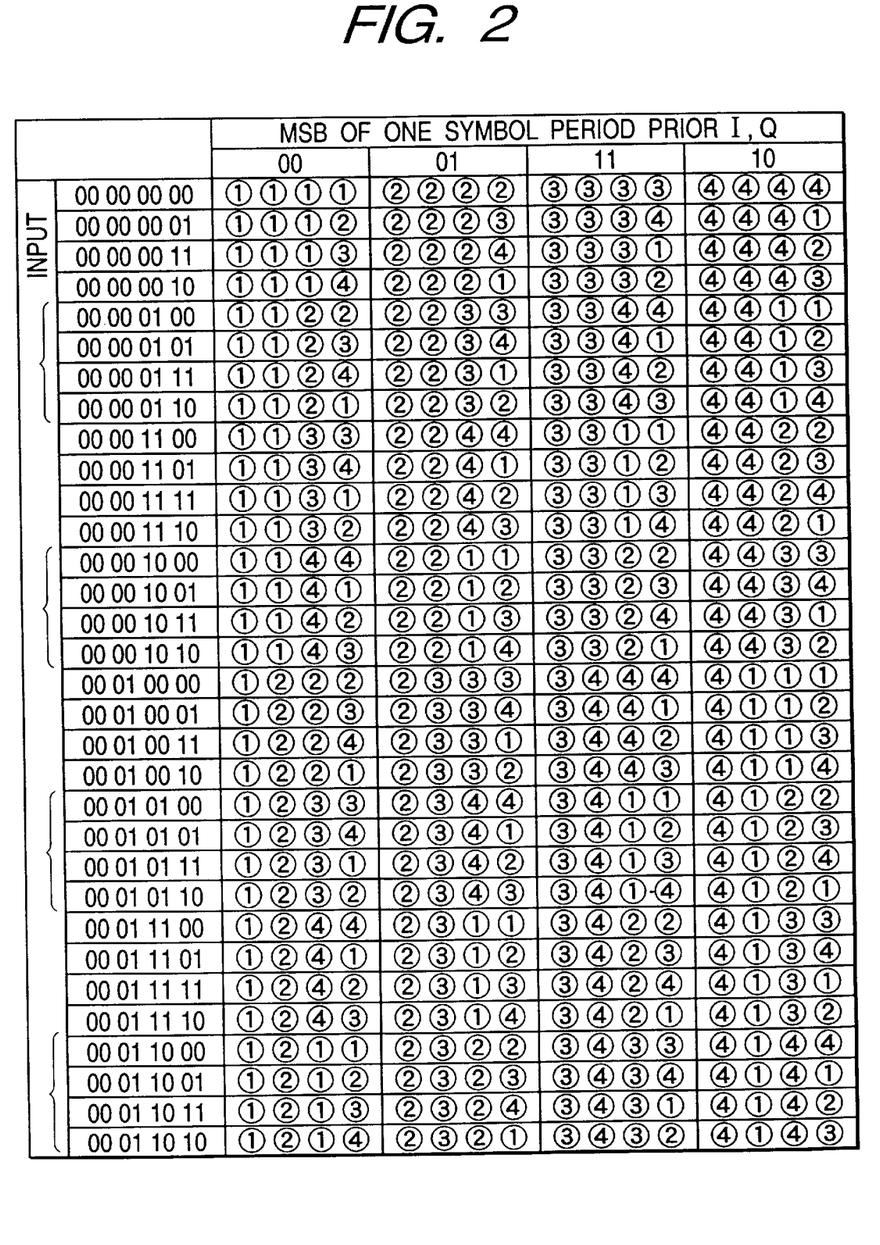
Figure 4:
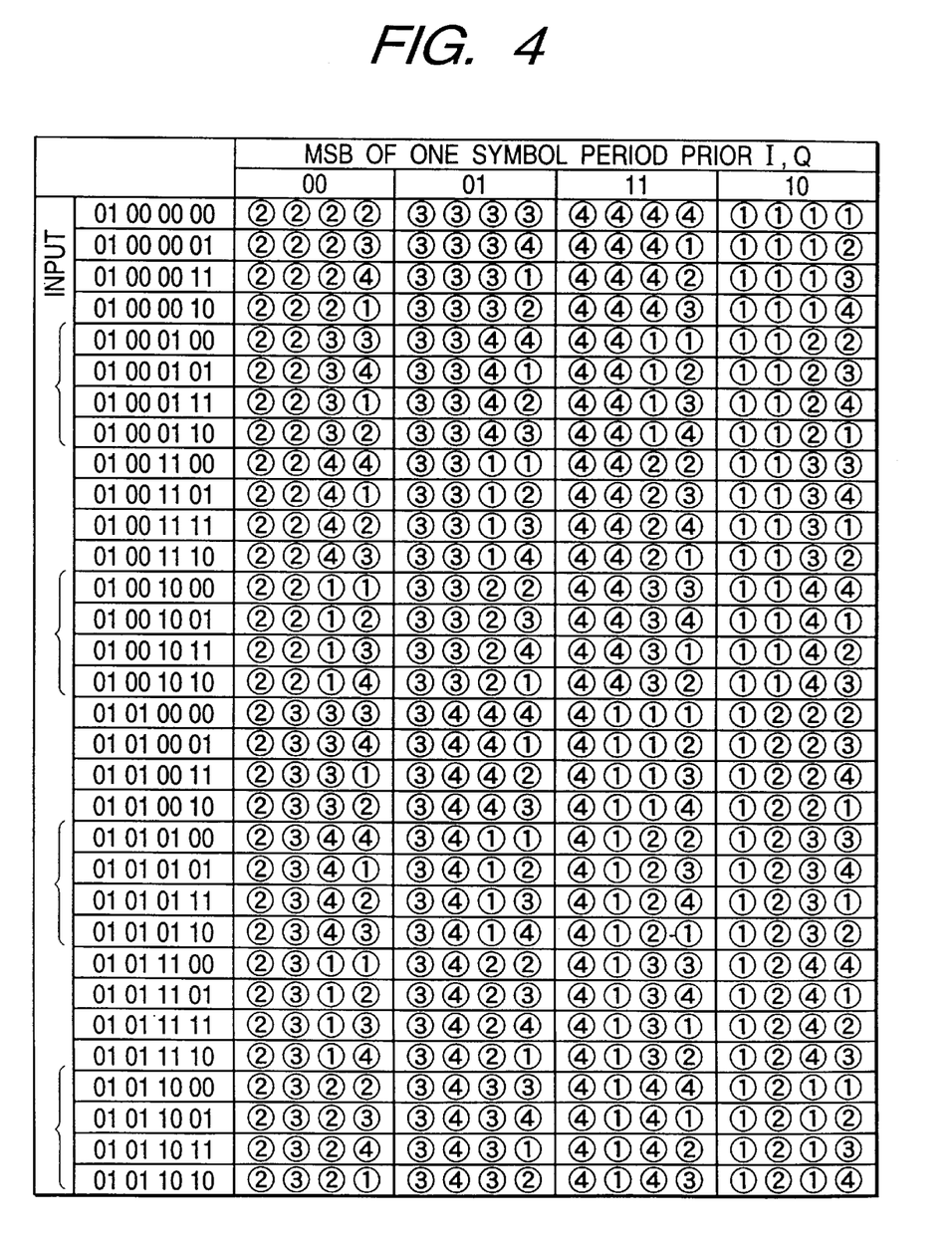
Figure 5:
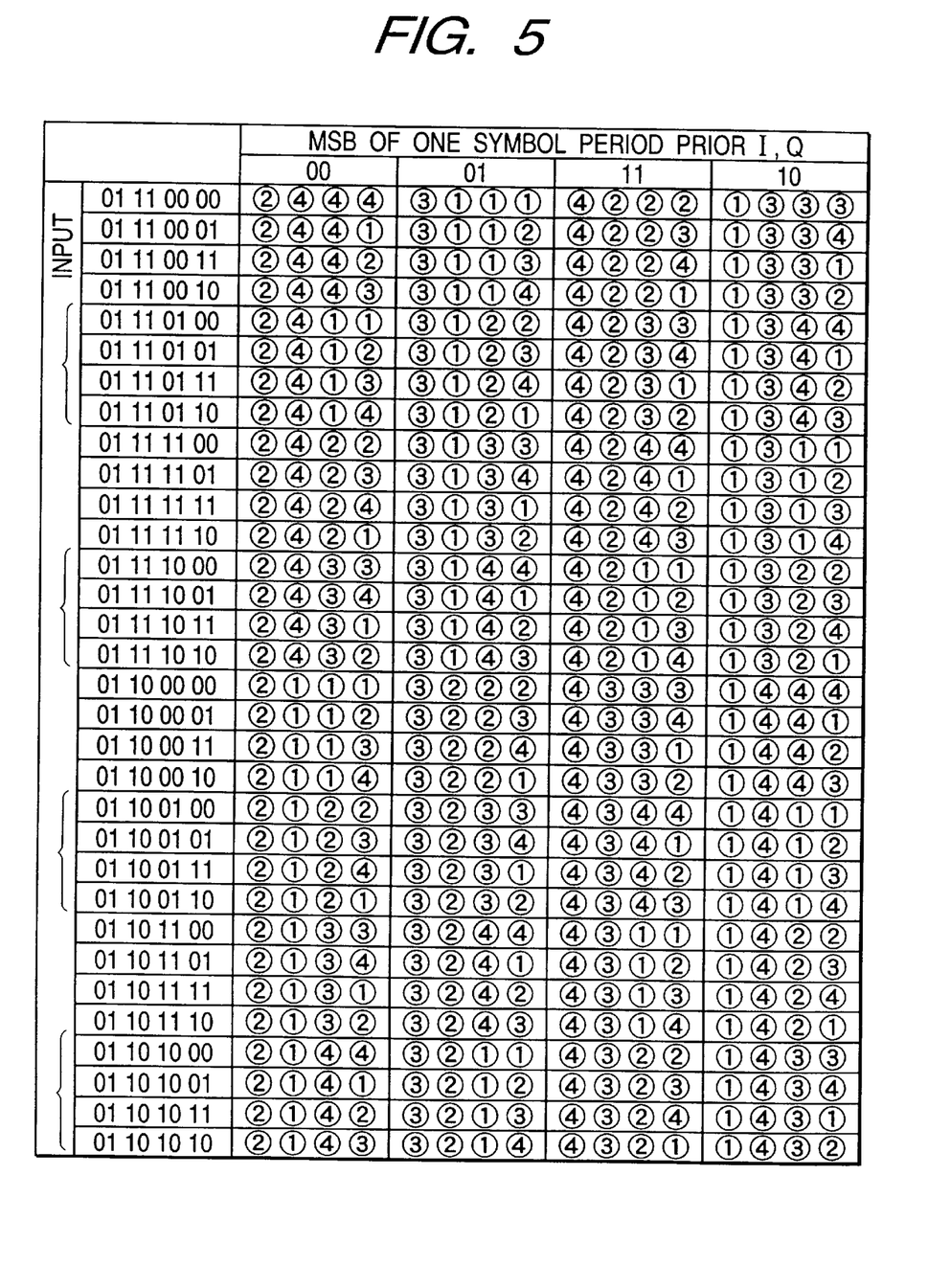
Figure 7:
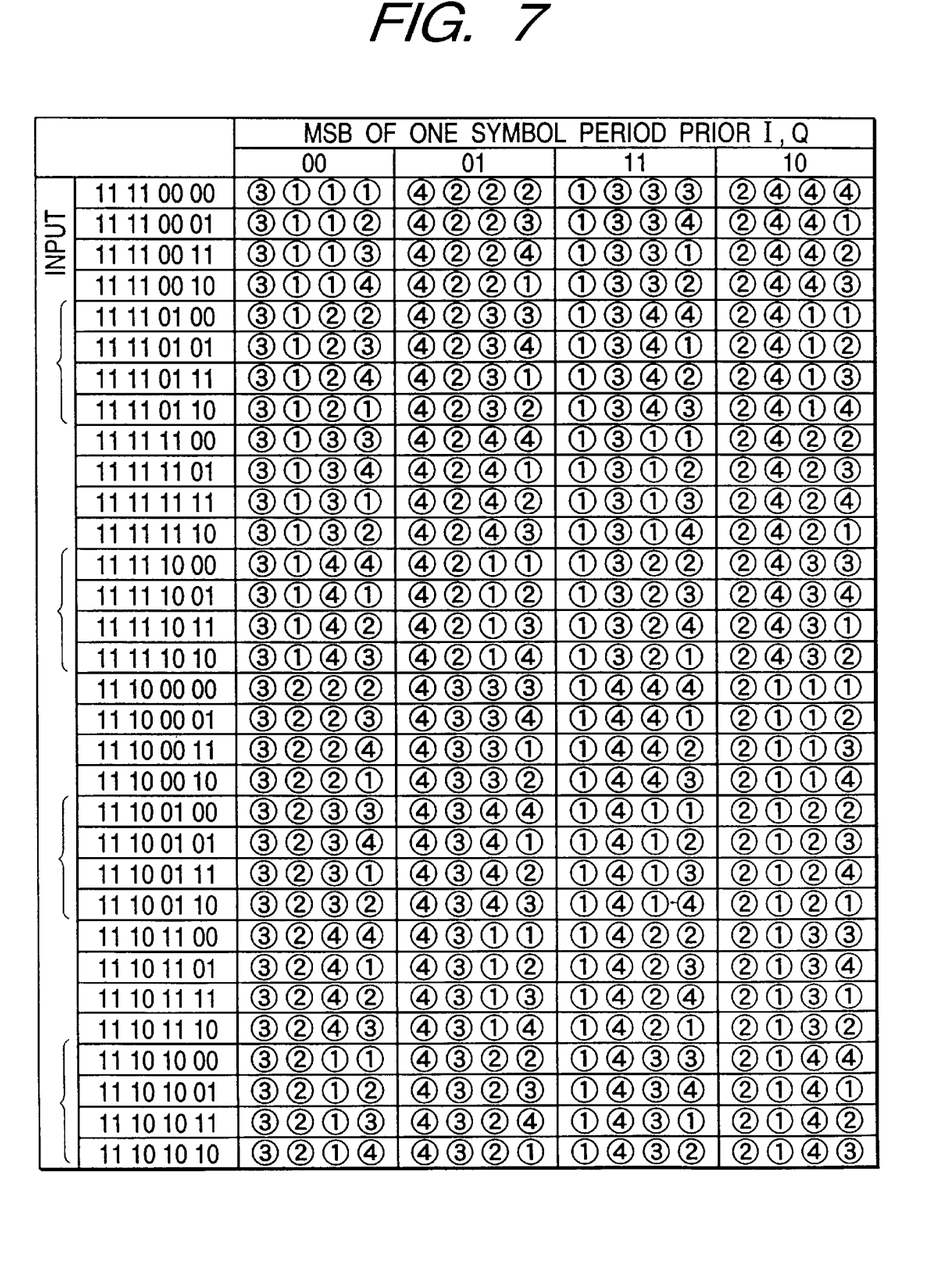
Figure 8:
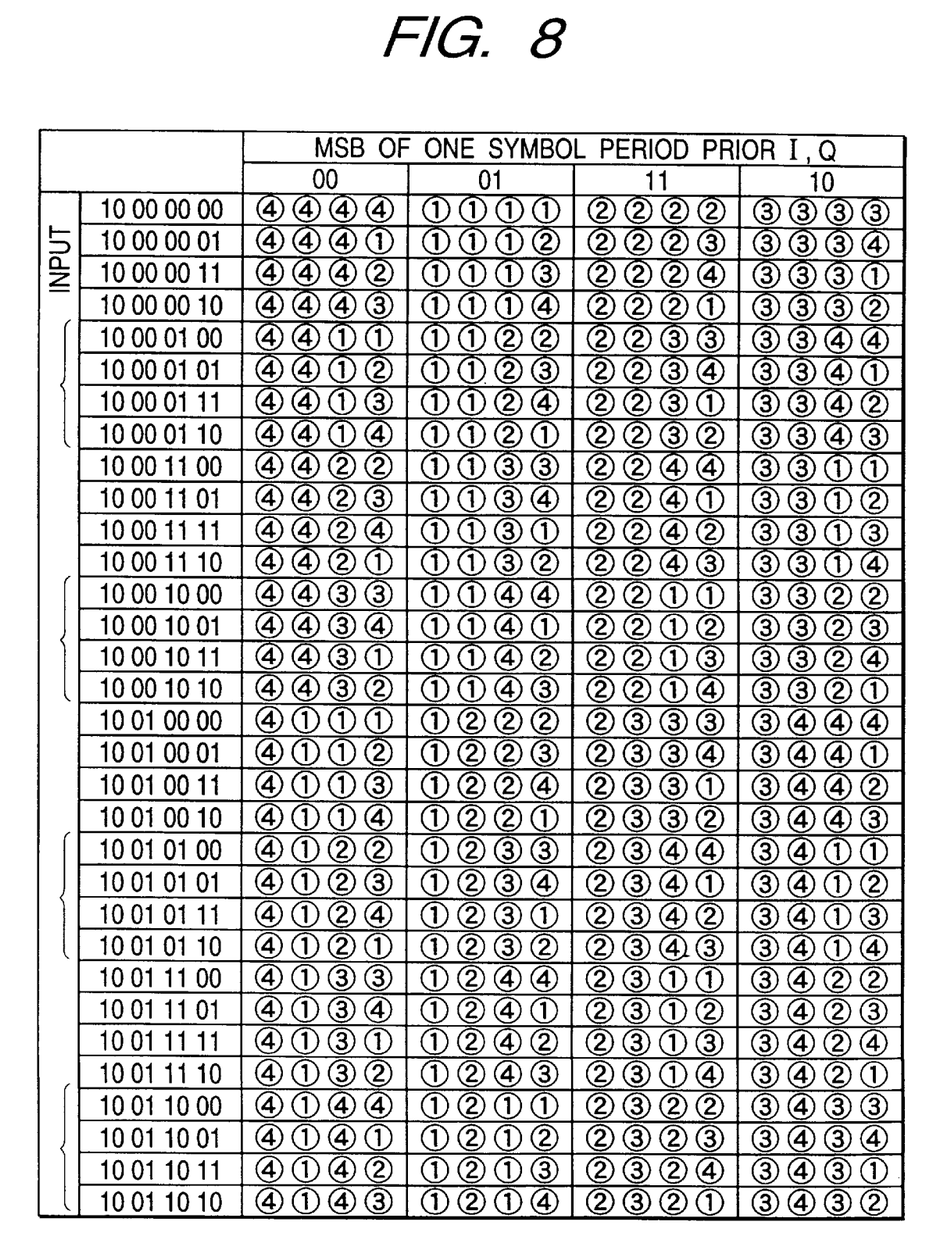
Figure 9:
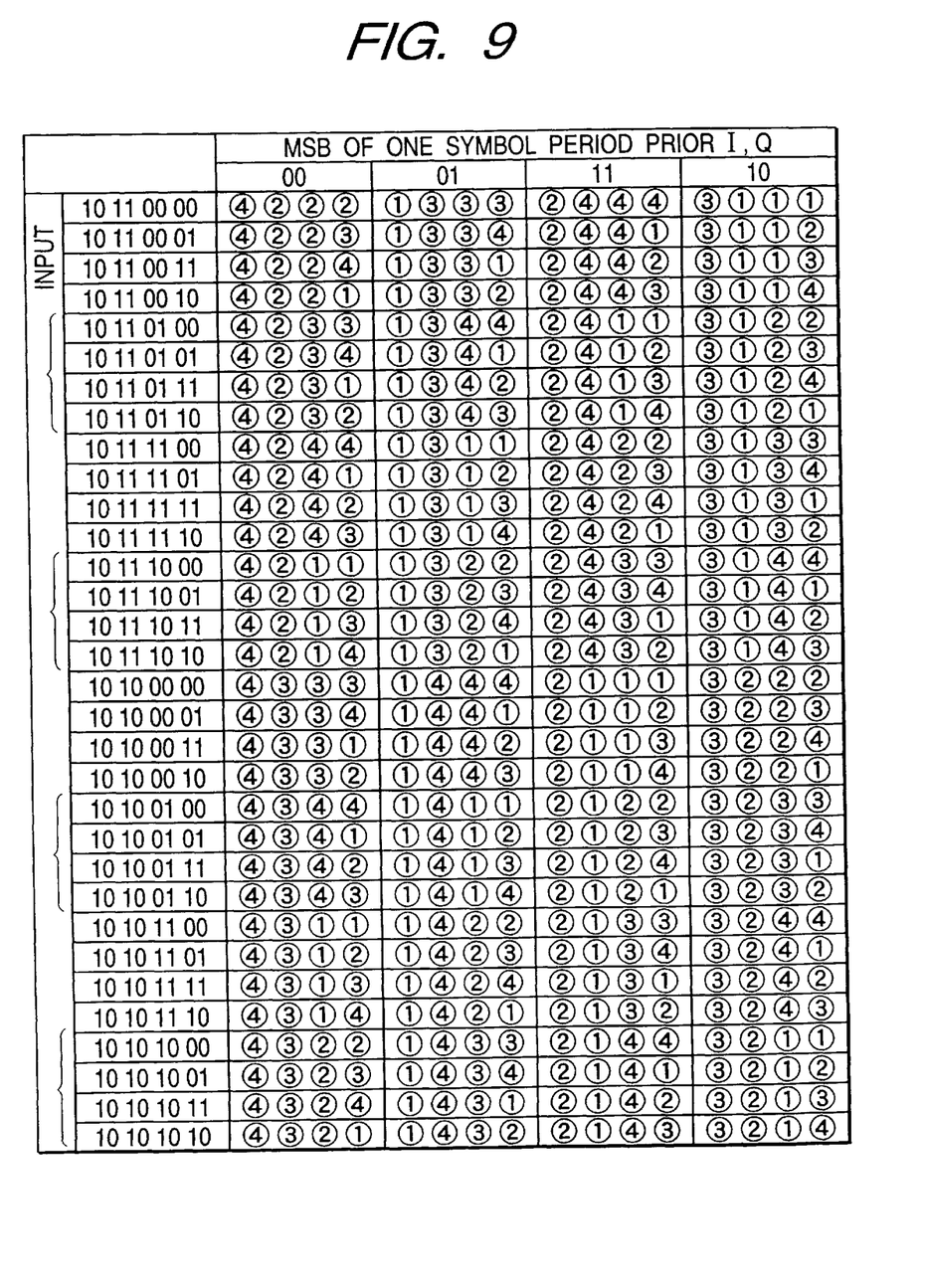

FIG. 1 is a block diagram of a DQPSK (Differential quadrature phase-shift keying) mapping circuit of the embodiment to the present invention.

In FIG. 1, numerals 11 to 18 denote 2N bits (hereinafter, it is assumed that N is a natural number and N=4) of input symbols (Xn, Yn), (Xn+1, Yn+1), (Xn+2, Yn+2), and (Xn+3, Yn+3). Numerals 19 to 26 denote flip-flop circuits for holding values of the input symbols (Xn, Yn), (Xn+1, Yn+1), (Xn+2, Yn+2), and (Xn+3, Yn+3) at the same time in response to a clock signal CLK1 31. Numerals 29 and 30 denote two bits of orthogonal signals (In−1, Qn−1) 27 and 28 which are prior by two symbol periods. The clock signal 31 is supplied to inputs of the flip-flop circuit 19 to 26 and 29 and 30.

Numeral 32 denotes a parallel decoder for obtaining the present symbol orthogonal signals (In, Qn), (In+1, Qn+1), (In+2, Qn+2), (In+3, Qn+3) at the same time from the eight bits of input symbol data from the flip-flop circuit 19 to 26 and the orthogonal signal data which is prior by one symbol period from the flip-flop circuit 29 and 30. Numerals 33 and 34 denotes selectors for controlling the outputs signals of the parallel decoder 32. Numeral 35 denotes a controller responsive to a clock signal 36 for controlling the selectors 33 and 34 in response to the clock signal CLK2 36. The clock signal CLK1 31 is obtained by frequency-dividing the clock signal CLK2 36 with N=4.

Figure 10:
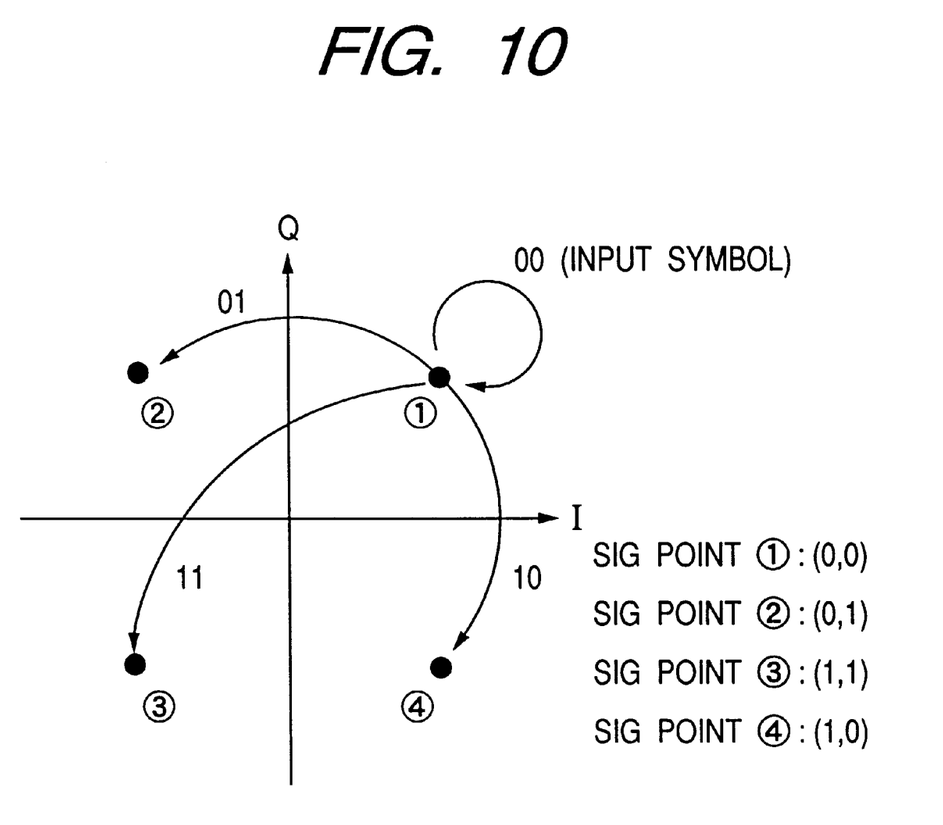
FIG. 10 is a graphical drawing showing signal point location of the embodiment.
Figure 11:
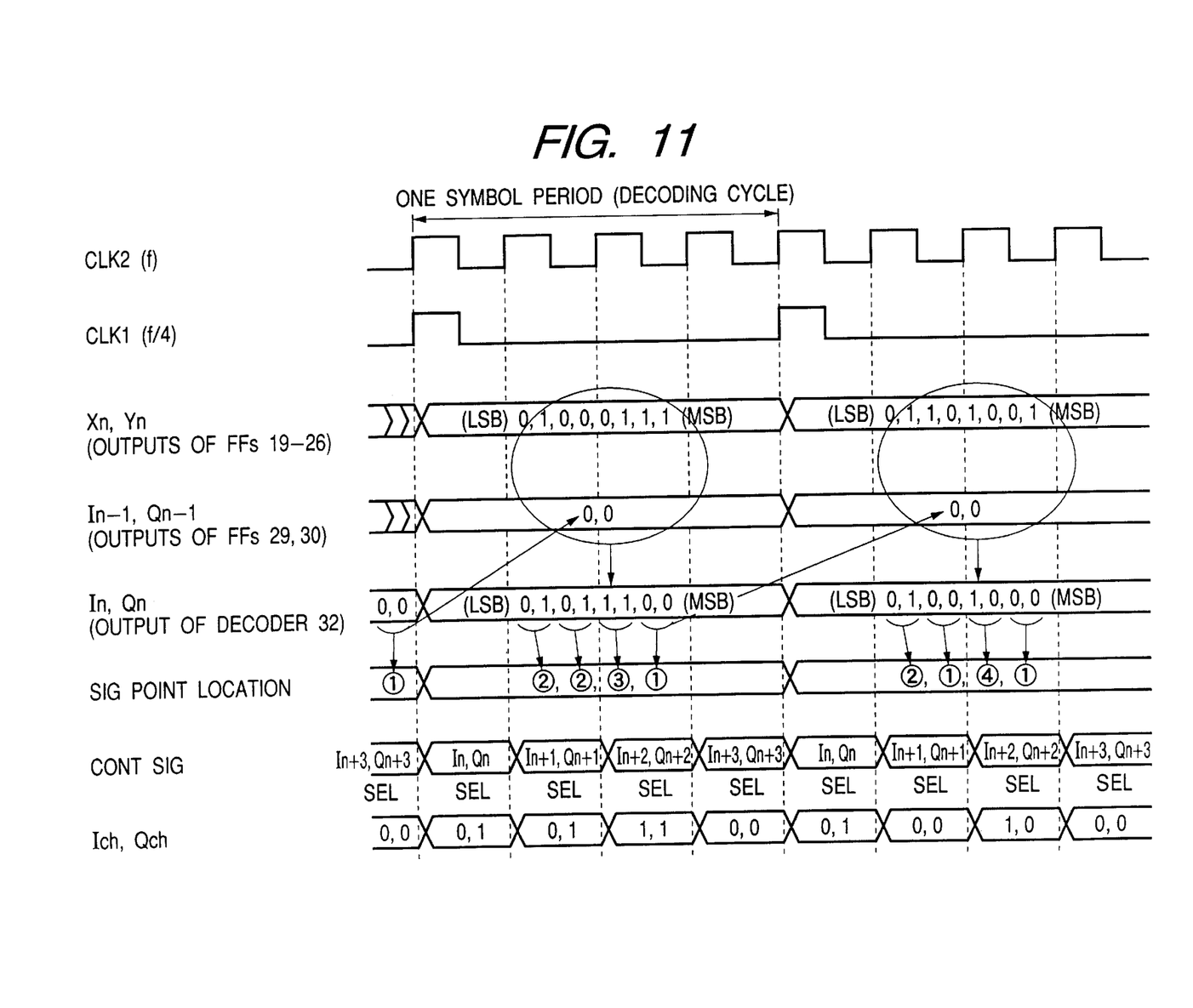
FIG. 11 is a time chart of the embodiment.

FIGS. 2 to 9 are tables of signal conditions of this embodiment. FIG. 10 is a graphical drawing showing signal point location of this embodiment. FIG. 11 is a time chart of this embodiment.

An operation of the DQPSK mapping circuit will be described referring FIGS. 2 to 9. In the four phase DQPSK modulation, a signal point location changes as shown in FIG. 10. FIGS. 2 to 9 show signal point locations after transients when eight bits of input symbols (Xn, Yn), (Xn+1, Yn+1), (Xn+2, Yn+2), and (Xn+3, Yn+3) are inputted.

It is assumed the input symbols are

| (LSB) | 0 | 1 | 0 | 0 | 0 | 1 | 1 | 1 | (MSB) |
|-------|---|---|---|---|---|---|---|---|-------|
|       | Xn | Yn | Xn+1 | Yn+1 | Xn+2 | Yn+2 | Xn+3 | Yn+3 | |
| (LSB) | 0 | 1 | 1 | 0 | 1 | 0 | 0 | 1 | (MSB) |
|       | Xn+4 | Yn+4 | Xn+5 | Yn+5 | Xn+6 | Yn+6 | Xn+7 | Yn+7 | | and the signal point location is assumed as ① in an initial condition. The operation in this condition will be described referring to FIG. 11. At first, the input symbols (Xn, Yn, Xn+1, Yn+1, Xn+2, Yn+2, Xn+3, Yn+3)=(0, 1, 0, 0, 0, 1, 1, 1) and (In−1, Qn−1)=(0 ,0) are held by the flip-flops 19 to 26 in response to the clock signal CLK1 31. Then, the parallel decoder 32 decodes outputs of the flip-flop circuits 19 to 26 and 29 and 30 and outputs the present symbols of the orthogonal signals (In, Qn, In+1, Qn+1, In+2, Qn+2, In+3, Qn+3)=(0, 1, 0, 1, 1, 1, 0, 0) and four symbols of decoded data is outputted at the present symbol outputs 38 to 45 at the same time. The four symbols of decoded data are successively outputted from LSB (present symbol outputs 38, 42 at the I channel signals 46 and 47 as serial outputs. That is, the signal point locations changes in the order of ①→②→②→③→①.

Then, the MSB (In+3, Qn+3)=(0, 0) of the present symbol 38 to 45 (In, Qn, In+1, Qn+1, In+2, Qn+2, In+3, Qn+3)=(0, 1, 0, 1, 1, 1, 0, 0) and the input symbols of (Xn+4, Yn+4, Xn+5, Yn+5, Xn+6, Yn+6, Xn+7, Yn+7)=(0, 1, 1, 0, 1, 0, 0, 1) are held by flip-flops 19 to 26 and 29 and 30 at the same time in response to the clock signal CLK 1 31 as one symbol period prior condition (In−1, Qn−1)=(0, 0) and the input symbols (Xn, Yn, Xn+1, Yn+1, Xn+2, Yn+2, Xn+3, Yn+3)= (0, 1, 1, 0, 1, 0, 0, 1). Then, the parallel decoder 32 decodes the outputs of the flip-flops 19 to 26 and 29 and 30 and outputs (In, Qn, In+1, Qn+1, In+2, Qn+2, In+3, Qn+3)=(0, 1, 0, 0, 1, 0, 0, 0) at the present symbol outputs 38 to 45 as four symbol data at the time in parallel. The data of four symbols are successively output serially from LSB at the Ich and Qch outputs 46 and 47 by the selectors 33 and 34 in response to the output 37 of the controller 37 generated in response to the clock signal CLK2 36. That is, the signal point locations changes in the order of ②→①→④→①.

As described, the parallel decoder 32 outputs the present symbols (In, Qn, In+1, Qn+1, In+2, Qn+2, In+3, Qn+3) at the same time by decoding one symbol period prior data (In−1, Qn−1) and the input symbols (Xn, Yn, Xn+1, Yn+1, Xn+2, Yn+2, Xn+3, Yn+3) successively.

Referring to FIGS. 2 to 9, the signal point location transient as follows:

① (initial condition)
→②→②→③→①
→②→①→④→①

This is replaced by the (In, Qn) signal output as follows:

| 0 | 0 (initial condition) |   |   |   |   |   |   |
|---|-----------------------|---|---|---|---|---|---|
| In−1 | Qn−1 |   |   |   |   |   |   |
| 0 | 1 | 0 | 1 | 1 | 1 | 0 | 0 |
| In | Qn | In+1 | Qn+1 | In+2 | Qn+2 | In+3 | Qn+3 |

-continued

| 0 | 1 | 0 | 0 | 1 | 0 | 0 | 0 |
|---|---|---|---|---|---|---|---|
| In+4 | Qn+4 | In+5 | Qn+5 | In+6 | Qn+6 | In+7 | Qn+7 |

In this condition, a frequency of the clock signal CLK1 31 is 1/N (N=4) of the clock CLK2 36, N being a natural number.

Figure 12:
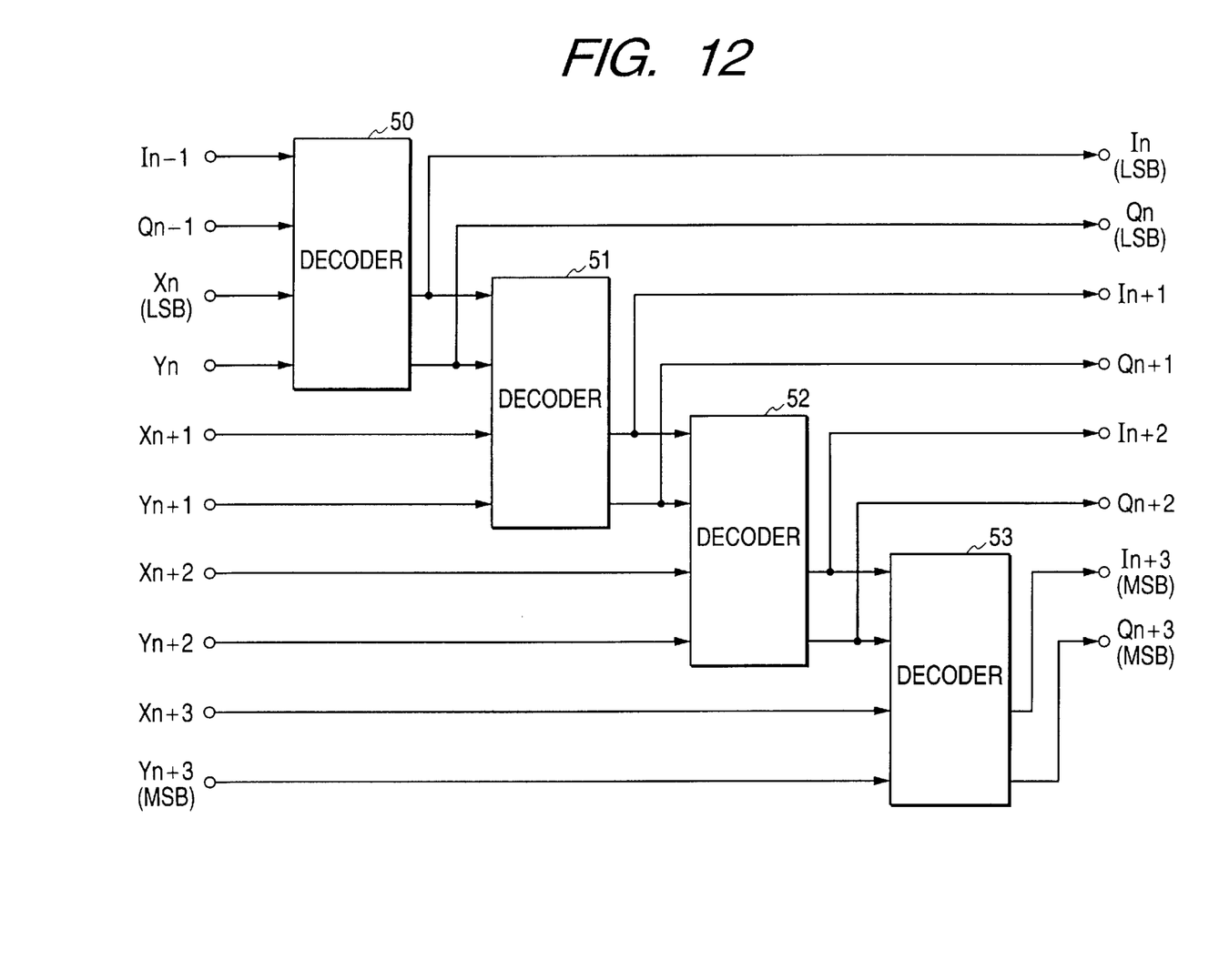
FIG. 12 is a block diagram of the parallel decoder shown in FIG. 1.

FIG. 12 is a block diagram of the parallel decoder 32 shown in FIG. 1. In FIG. 12, the input symbol (Xn, Yn) and one symbol period prior orthogonal signals (In−1, Qn−1) are inputted to the decoder 50. Then, outputs of the decoder 50 are inputted to the decoder 51 as one symbol period prior orthogonal signals (In−1, Qn−1) in the decoder 51 which are decoded with the input symbol (Xn+1, Yn+1). Then, outputs of the decoder 51 are inputted to the decoder 52 as one symbol period prior orthogonal signals (In−1, Qn−1) in the decoder 52 which are decoded with the input symbol (Xn+2, Yn+2). Then, outputs of the decoder 52 are inputted to the decoder 53 as one symbol period prior orthogonal signals (In−1, Qn−1) in the decoder 53 which are decoded with the input symbol (Xn+3, Yn+3). As mentioned, the decoders 50 to 53 output the present symbols (In, Qn, In+1, Qn+1, In+2, Qn+2, In+3, Qn+3) in parallel at the same time. That is, an Mth decoder out of the first decoder 50 to Nth decoder 53 decodes 2Mth bit and (2M−1)th bits of the input data and outputs of (M−1)th decoder, M being a natural number and M≦5 N, wherein the first decoder 50 decodes the one symbol period prior I and Q data and the first and second bits of the input data.

What is claimed is:

1. A DQPSK mapping circuit comprising:

parallel decoding means having input means for decoding first to 2Nth bits of input data and one symbol period prior I and Q data which are prior by one symbol period from the present decoding cycle thereof through said input means and outputting serial first to Nth I and Q data of the present decoding cycle in parallel, N is a natural number; and supplying means for supplying said Nth I and Q data to said input means as said one symbol period prior I and Q data in the succeeding decoding cycle of said parallel decoding means.

2. The DQPSK mapping circuit as claimed in claim 1, wherein said parallel decoding means comprises first to Nth decoders, an Mth decoder out of said first to Nth decoders decoding 2Mth bit and (2M−1)th bits of said input data and outputs of (M−1)th decoder, M being a natural number and M≦N, wherein said first decoder decodes said one symbol period prior I and Q data and said first and second bits of said input data.

3. The DQPSK mapping circuit as claimed in claim 1, wherein said supplying means comprises holding means for holding values of said Nth I and Q data of the present decoding cycle and outputting said values in the succeeding decoding cycle.

4. A DQPSK mapping circuit as claimed in claim 1, wherein said input means inputs said first to 2Nth bits of said input data and said one symbol period prior I and Q data in parallel.

5. A DQPSK mapping circuit as claimed in claim 1, wherein said parallel decoding means includes a table representing a relation between values of said input data and most significant bits of one symbol period prior I and Q data and said serial first to Nth I and Q data.

6. A DQPSK mapping circuit comprising:
  a first flip-flop circuit for holding and outputting values of input data of first to 2Nth bits in response to a clock signal indicative of one symbol period;
  parallel decoding means having input means for decoding said values of said input data of first to 2Nth bits and one symbol period prior I and Q data which are prior by said one symbol period from the present decoding cycle through said input means and outputting serial first to Nth symbol period I and Q data of the present decoding cycle in parallel, N being a natural number; and
  a second flip-flop circuit responsive to said clock signal for holding values of said Nth I and Q data in the present decoding cycle and outputting said values in the succeeding decoding cycle.

7. The DQPSK mapping circuit as claimed in claim 6, further comprises first selecting means responsive to a second clock signal for outputting one of said serial first to Nth I data of the present decoding period successively and second selecting means responsive to said second clock signal for outputting one of said serial first to Nth symbol period Q data of the present decoding period successively, a frequency of said second clock signal being 1/N of a frequency of said first clock signal.

8. The DQPSK mapping circuit as claimed in claim 6, wherein said parallel decoding means comprises first to Nth decoders, an Mth decoder out of said first to Nth decoders decoding 2Mth bit and (2M−1)th bits of said input data and outputs of (M−1)th decoder, M being a natural number and M≦N, wherein said first decoder decodes said one symbol period prior I and Q data and said first and second bits of said input data.

9. A DQPSK mapping circuit comprising:
  parallel decoding means having input means for decoding first to 2Nth bits of input data and one symbol period prior I and Q data which are prior by one symbol period from the present decoding cycle thereof through said input means and outputting serial first to Nth I and Q data of the present decoding cycle in parallel, N being a natural number≧1;
  said parallel decoding means comprising a plurality of decoders wherein a Kth decoder is connected to receive an output of a (K−1)th decoder, K being a natural number N≧K and to output an output symbol of said I and Q data of the present decoding cycle; and
  supplying means for supplying said Nth I and Q data to said input means as said one symbol period prior I and Q data in the succeeding decoding cycle of said parallel decoding means.

10. A DPSK mapping circuit as claimed in claim 9, wherein said Kth decoder includes an input for one symbol prior data;
  said Kth decoder receiving said output of said (K−1)th decoder on said input for one symbol prior data;
  said Kth decoder receiving a portion of said input data;
  said Kth decoder decoding said portion of said input data and said output of said (K−1)th decoder to provide said output symbol of said I and Q data of the present decoding cycle.

* * * * *